United States Patent
Hiroki et al.

(10) Patent No.: US 11,084,443 B2
(45) Date of Patent: Aug. 10, 2021

(54) VEHICLE, SYSTEM FOR DETERMINING SEAT BELT WEARING CONDITION, AND METHOD OF DETERMINING SEAT BELT WEARING CONDITION

(71) Applicant: TOYOTA JIDOSHA KABUSHIKI KAISHA, Toyota (JP)

(72) Inventors: Daisuke Hiroki, Okazaki (JP); Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 16/376,113

(22) Filed: Apr. 5, 2019

(65) Prior Publication Data
US 2019/0375360 A1    Dec. 12, 2019

(30) Foreign Application Priority Data
Jun. 7, 2018  (JP) .............................. JP2018-109573

(51) Int. Cl.
*B60R 21/015*    (2006.01)
*B60R 22/48*    (2006.01)

(52) U.S. Cl.
CPC .. *B60R 21/01544* (2014.10); *B60R 21/01534* (2014.10); *B60R 21/01538* (2014.10); *B60R 22/48* (2013.01); *B60R 2022/485* (2013.01)

(58) Field of Classification Search
CPC ........ B60R 21/01544; B60R 21/01534; B60R 21/01538; B60R 22/48; B60R 2022/485
(Continued)

(56) References Cited

U.S. PATENT DOCUMENTS 7,511,610 B2 *  3/2009  Downey .................. B60R 22/48
                                               340/407.1
7,533,903 B2 *  5/2009  Takao .................... B60R 22/44
                                               242/374
(Continued)

FOREIGN PATENT DOCUMENTS

DE        10133759 A1     1/2003
EP         2937251 A1    10/2015
(Continued)

OTHER PUBLICATIONS

Translation of JP-2017056877-A accessed at www.espacenet.com on Sep. 29, 2020. (Year: 2017).*

*Primary Examiner* — James A Shriver, II
*Assistant Examiner* — Hilary L Johns
(74) *Attorney, Agent, or Firm* — Oliff PLC (57) ABSTRACT

A system that determines a condition of wearing of a seat belt, including: a marker provided on at least a part of the seat belt; an image capture processing unit that emits electromagnetic waves of the prescribed wavelength band toward a predetermined range and that creates an image indicating intensity distribution of electromagnetic waves of the prescribed wavelength band, based on reflected waves reflected in the predetermined range; a shape estimating unit that estimates a shape of an occupant based on the image, detects the marker from the image, and estimates a shape of the seat belt based on the marker detected; and a determining unit that determines the condition of wearing of the seat belt by the occupant, based on a positional relationship between the occupant and the seat belt.

7 Claims, 5 Drawing Sheets

(58) Field of Classification Search
USPC .......................................................... 280/801
See application file for complete search history.

(56) References Cited

U.S. PATENT DOCUMENTS

| | | | |
|---|---|---|---|
| 9,821,761 B2 | 11/2017 | Le et al. | |
| 2007/0096445 A1* | 5/2007 | Breed | B60R 21/0152 |
| | | | 280/735 |
| 2017/0330044 A1* | 11/2017 | Telpaz | B60K 35/00 |
| 2018/0326944 A1* | 11/2018 | Cech | G06K 9/00838 |
| 2019/0258263 A1* | 8/2019 | Wendel | B60K 28/04 |

FOREIGN PATENT DOCUMENTS

| | | | | |
|---|---|---|---|---|
| JP | H09-501120 A | | 2/1997 | |
| JP | 2008-068742 A | | 3/2008 | |
| JP | 2017056877 A | * | 3/2017 | |
| JP | 2018-118671 A | | 8/2018 | |
| JP | 2018118671 A | * | 8/2018 | |
| WO | 94/22693 A1 | | 10/1994 | |
| WO | WO-9422693 A1 | * | 10/1994 | ....... B60R 21/01516 |

* cited by examiner

FRONT ←→ REAR

FIG. 7

VEHICLE, SYSTEM FOR DETERMINING SEAT BELT WEARING CONDITION, AND METHOD OF DETERMINING SEAT BELT WEARING CONDITION

INCORPORATION BY REFERENCE

The disclosure of Japanese Patent Application No. 2018-109573 filed on Jun. 7, 2018 including the specification, drawings and abstract is incorporated herein by reference in its entirety.

BACKGROUND

1. Technical Field

The disclosure relates to a vehicle, a system for determining a seat belt wearing condition of an occupant, and a method of determining a seat belt wearing condition.

2. Description of Related Art

A seat belt wearing condition of an occupant is determined based on whether a tongue plate is fitted in a buckle. However, even when the occupant is not wearing the seat belt, the seat belt wearing condition may be easily reproduced by fitting a dummy tongue plate into the buckle.

As a countermeasure against the above situation, a system disclosed in Japanese Unexamined Patent Application Publication No. 9-501120 (JP 9-501120 A), for example, determines a seat belt wearing condition of an occupant, by attaching a material that emits far-infrared rays according to heat, to a seat belt, and monitoring the far-infrared rays emitted from the material.

SUMMARY

However, with the above technology described in JP 9-501120 A, the heat of a human body is less likely or unlikely to be transferred to the material of the seat belt when the occupant wears heavy outer clothes, for example. As a result, variations may arise in the amount of far-infrared rays emitted from the material, and the system may not be able to correctly determine a wearing condition even if the occupant is wearing the seat belt. Thus, with the technology described in JP 9-501120 A, the seat belt wearing condition of the occupant cannot be determined with high accuracy.

This disclosure provides a vehicle that can determine a seat belt wearing condition of an occupant with high accuracy, a system that determines the seat belt wearing condition, and a method of determining the seat belt wearing condition.

An aspect of the present disclosure relates to a system that determines a condition of wearing of a seat belt for an occupant, including: a marker provided on at least a part of the seat belt, the marker being configured to reflect or absorb electromagnetic waves of a prescribed wavelength band at a different rate from a material of the seat belt; an image capture processing unit that emits electromagnetic waves of the prescribed wavelength band toward a predetermined range including the occupant seated in a seat and that creates an image indicating intensity distribution of electromagnetic waves of the prescribed wavelength band, based on reflected waves reflected in the predetermined range; a shape estimating unit that estimates a shape of the occupant based on the image, detects the marker from the image, and estimates a shape of the seat belt based on the marker detected; and a determining unit that determines the condition of wearing of the seat belt by the occupant, based on a positional relationship between the occupant and the seat belt after the shape of the occupant and the shape of the seat belt are estimated.

According to the above aspect, the marker member provided on the seat belt is configured to reflect or absorb electromagnetic waves of the prescribed wavelength band at a different rate from the material of the seat belt. With this arrangement, in the image captured in the predetermined range and indicating the intensity distribution of electromagnetic waves of the prescribed wavelength band, the marker member and the seat belt are displayed such that they can be distinguished from each other. Thus, even when the occupant wears clothes of which the reflection rate or absorption rate is close to that of the marker member or the seat belt, the positional relationship between the occupant and the seat belt is found from either one of the marker member and the seat belt. Accordingly, the seat belt wearing condition of the occupant can be determined with high accuracy, irrespective of the clothes of the occupant.

In the above aspect, the marker may extend along a longitudinal direction of the seat belt; and the determining unit may determine that the occupant is wearing the seat belt, when the seat belt is located at a position that matches a predetermined wearing pattern extending across a body of the occupant.

With the above arrangement, the system can determine a correct wearing pattern, such as oblique hanging of a shoulder belt, of the seat belt that extends across the body of the occupant; therefore, it is possible to determine with high accuracy that the occupant is wearing the seat belt.

In the above aspect, the marker may be provided on one surface of the seat belt.

With this arrangement, if the seat belt is twisted, the intensity distribution of electromagnetic wave of the prescribed wavelength band in the image changes at points before and after a position where the seat belt is twisted; therefore, a condition, such as a twisted seat belt, can be detected.

In the above aspect, the system may further include an informing unit that gives a notice that urges the occupant to wear the seat belt, when the determining unit determines that the occupant is not wearing the seat belt.

With this arrangement, the occupant can become aware of a condition where the occupant is not wearing the seat belt.

In the above aspect, the electromagnetic waves of the prescribed wavelength band may comprise radio waves having a wavelength included in a range of 3 to 300 mm.

With the above arrangement, even when the marker member of the seat belt is covered with a blanket, or the like, through which visible light cannot pass, the marker member can be detected from the image.

Another aspect of the present disclosure relates to a vehicle including: a seat belt; a marker provided on at least a part of the seat belt, the marker being configured to reflect or absorb electromagnetic waves of a prescribed wavelength band at a different rate from a material of the seat belt; an image capture unit that emits electromagnetic waves of the prescribed wavelength band, toward a predetermined range including an occupant seated in a seat; and a processor configured to: create an image indicating intensity distribution of electromagnetic waves of the prescribed wavelength band, based on reflected waves reflected in the predetermined range; estimate a shape of the occupant based on the image, detect the marker from the image, and estimate a shape of the seat belt based on the marker detected; and determine a condition of wearing of the seat belt by the occupant, based on a positional relationship between the occupant and the seat belt after the shape of the occupant and the shape of the seat belt are estimated.

Another aspect of the disclosure relates to a method of determining a condition of wearing of a seat belt for an occupant, at least a part of the seat belt being provided with a marker configured to reflect or absorb electromagnetic waves of a prescribed wavelength band at a different rate from a material of the seat belt, the method including: emitting electromagnetic waves of the prescribed wavelength band, toward a predetermined range including the occupant seated in a seat; creating an image indicating intensity distribution of electromagnetic waves of the prescribed wavelength band, based on reflected waves reflected in the predetermined range; estimating a shape of the occupant based on the image, detecting the marker from the image, and estimating a shape of the seat belt based on the marker detected; and determining the condition of wearing of the seat belt by the occupant, based on a positional relationship between the occupant and the seat belt after the shape of the occupant and the shape of the seat belt are estimated.

With to the vehicle, the system that determines a seat belt wearing condition, and the method of determining a seat belt wearing condition of the present disclosure, the seat belt wearing condition of the occupant can be determined with high accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In a seat belt wearing condition determining system according to the disclosure, a marker member that reflects or absorbs electromagnetic waves of a prescribed wavelength band at a different rate from a material of a seat belt is provided on the seat belt. With this arrangement, the marker member and the seat belt are displayed such that they can be distinguished from each other, in an image that is captured in a predetermined range including an occupant and indicates the intensity distribution of the electromagnetic waves of the prescribed wavelength band. Accordingly, even when the reflection rate or absorption rate of clothes of the occupant is close to that of the marker member or the seat belt, the positional relationship between the occupant and the seat belt can be grasped from either one of the marker member and the seat belt. Thus, the seat belt wearing condition of the occupant can be determined with high accuracy.

Figure 1:
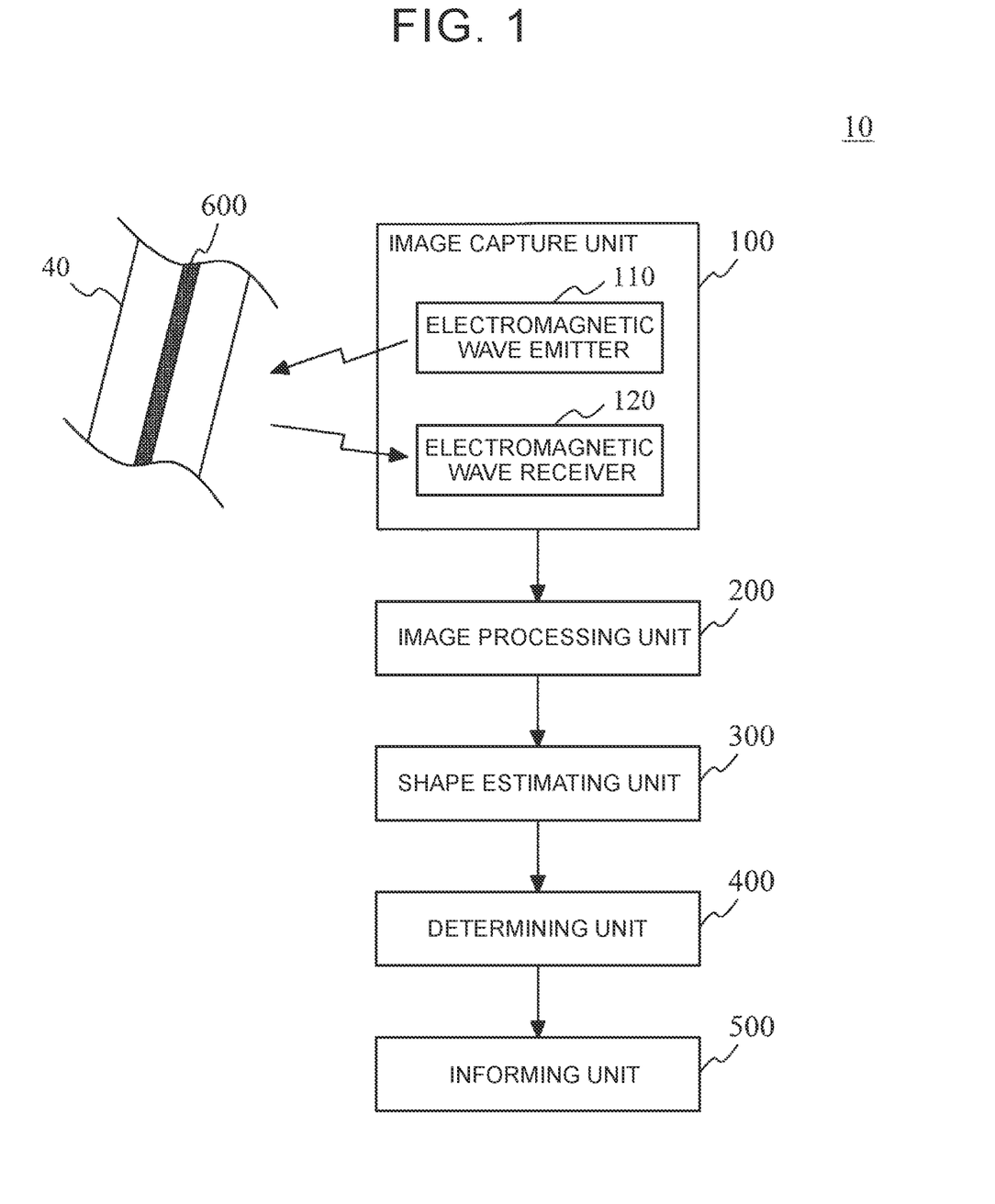
FIG. 1 is a view showing the configuration of a seat belt wearing condition determining system according to one embodiment of the disclosure.
Figure 2:
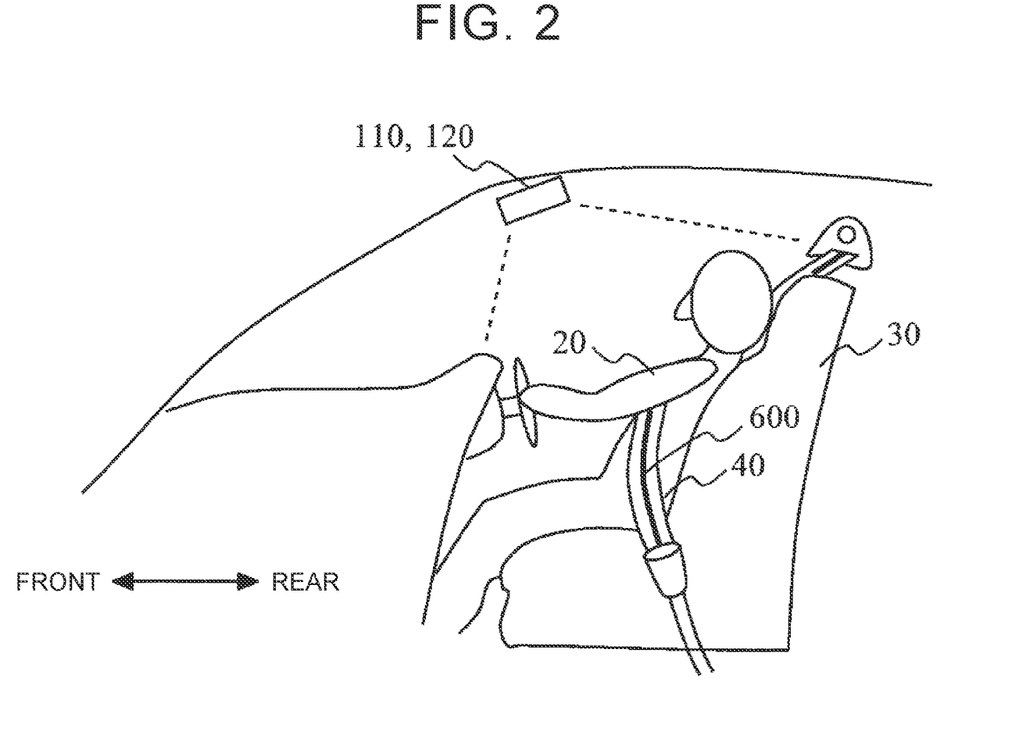
FIG. 2 is a side view schematically showing the vicinity of a driver's seat of a vehicle.

FIG. 1 is a functional block diagram showing an example of the configuration of a seat belt wearing condition determining system 10 according to one embodiment of the disclosure. FIG. 2 is a side view schematically showing the vicinity of a driver's seat of a vehicle installed with the seat belt wearing condition determining system 10. In FIG. 2, "FRONT" denotes the front direction of the vehicle, and "REAR" denotes the rear direction of the vehicle.

The seat belt wearing condition determining system 10 of this embodiment includes an image capture unit 100 including an electromagnetic wave emitter 110 and an electromagnetic wave receiver 120, image processing unit 200, shape estimating unit 300, determining unit 400, informing unit 500, and marker member 600. At least the image processing unit 200, shape estimating unit 300, determining unit 400, and informing unit 500 may be provided by function modules that can be implemented when a processor (not shown) executes a program or programs.

The marker member 600 is able to reflect or absorb electromagnetic waves of a prescribed wavelength band, and is provided on at least a part of the seat belt 40. Light, such as radio waves having wavelengths (GHz band) included in a range of 3 to 300 mm, infrared rays, visible light, or ultraviolet rays, may be used as the electromagnetic waves of the prescribed wavelength band. Also, the wavelength of the electromagnetic waves used in this embodiment is preferably selected from wavelengths with which the electromagnetic waves do not pass through or are not diffracted by human bodies. The marker member 600 is made of a material having a different rate of reflection or absorption of the electromagnetic waves of the prescribed wavelength band, from the material of the seat belt 40.

Figure 3:
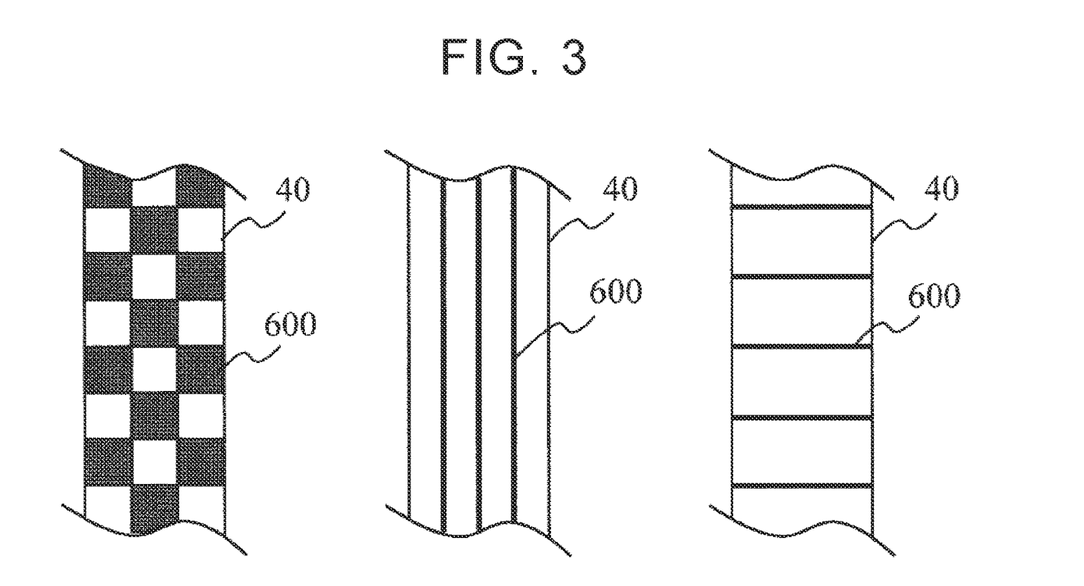
FIG. 3 is a view showing examples of patterns of a marker member provided on a seat belt.

The marker member 600 is preferably provided on one surface of the seat belt 40, so as to extend along the longitudinal direction of the seat belt 40. The marker member 600 may be attached to or printed on the surface, or may be sewn into the material. The marker member 600 may have a checkerboard pattern, a striped pattern, or the like, as shown in FIG. 3 by way of example.

The electromagnetic wave emitter 110 is provided in a front, upper section of a vehicle cabin, and emits electromagnetic waves of a prescribed wavelength band toward a predetermined range in the vehicle cabin. The electromagnetic wave emitter 110 may consist of light-emitting devices, for example. The predetermined range (which will be referred to as "selected range") is specifically a range including a seat 30 of the vehicle, and desirably including the upper body of an occupant 20 seated in the seat 30. The seat 30 may include only the driver's seat, or may include a passenger's seat and/or a rear seat in addition to the driver's seat.

The electromagnetic wave receiver 120 captures (receives) electromagnetic waves (reflected waves) of the prescribed wavelength band, when the electromagnetic waves radiated from the electromagnetic wave emitter 110 toward the selected range are reflected by and returned from the occupant 20, seat 30, seat belt 40, marker member 600, etc. which exist in the selected range. The electromagnetic wave receiver 120 may consist of light receiving elements or an imaging camera, for example. The electromagnetic wave receiver 120 may also be provided in the front, upper section of the vehicle cabin, in the vicinity of the electromagnetic wave emitter 110.

The image processing unit 200 performs prescribed image processing on reflected waves of the electromagnetic waves of the prescribed wavelength band, which were captured (received) by the electromagnetic wave receiver 120, and creates a two-dimensional image indicating the intensity distribution of the electromagnetic waves of the prescribed wavelength band in the selected range. The two-dimensional image is only required to be an image with which the electromagnetic waves of the prescribed wavelength band reflected by at least the marker member 600 can be distinguished from electromagnetic waves reflected or radiated by other members or portions. Preferably, the two-dimensional image is an image with which electromagnetic waves reflected or radiated by the occupant 20 can be detected.

The shape estimating unit 300 estimates the shape of the occupant 20, based on the two-dimensional image created by the image processing unit 200. In one example, the shape estimating unit 300 estimates a rough outline (profile) of the occupant 20, based on a difference between the electromagnetic waves of the prescribed wavelength band reflected or radiated by the occupant 20 and the electromagnetic waves of the prescribed wavelength band reflected by the seat 30, in the two-dimensional image. Also, the shape estimating unit 300 estimates the shape of the seat belt 40, based on the two-dimensional image created by the image processing unit 200. In one example, the shape estimating unit 300 detects the marker member 600 in the two-dimensional image, and estimates a rough shape of the seat belt 40 (a rough position at which the seat belt 40 is present), based on the detected marker member 600.

The determining unit 400 determines a condition of wearing of the seat belt 40 by the occupant 20, based on the positional relationship between the occupant 20 and seat belt 40, of which the shapes were estimated. A manner of determining the wearing condition will be described later.

When the determining unit 400 determines that the occupant is not wearing the seat belt 40, the informing unit 500 informs the occupant 20 that he/she is not wearing the seat belt 40. This notification may be performed through voice output via a speaker device, or image display via a display device, for example.

Figure 4A:
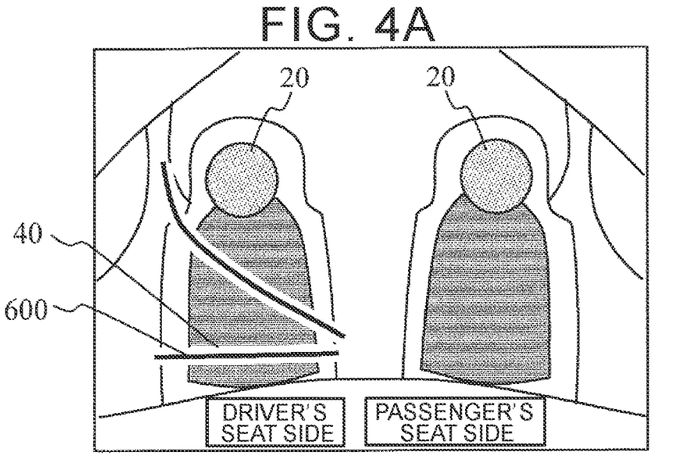
FIG. 4A is a schematic view of the shapes of occupants and seat belt estimated based on a two-dimensional image.
Figure 4B:
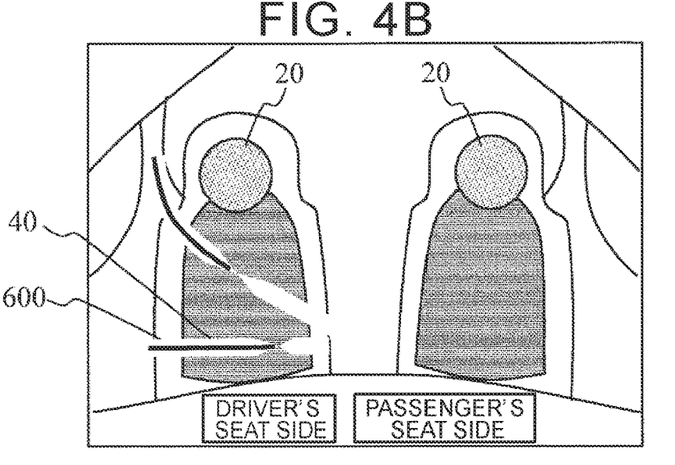
FIG. 4B is a schematic view of the shapes of occupants and seat belt estimated based on a two-dimensional image.
Figure 4C:
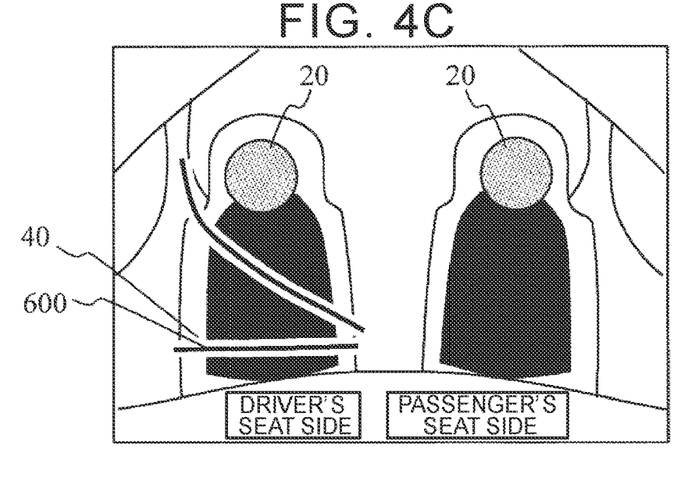
FIG. 4C is a schematic view of the shapes of occupants and seat belt estimated based on a two-dimensional image.

FIGS. 4A to 4C show examples each schematically indicating the shapes of occupants 20 and seat belt 40 (marker member 600) estimated by the shape estimating unit 300, based on the two-dimensional image created by the image processing unit 200. In the examples of FIGS. 4A to 4C, the marker member 600 in the form of a line is provided in the middle of the seat belt 40 as viewed in the width direction, so as to extend along the longitudinal direction of the belt 40.

In the case of FIG. 4A, the seat belt 40 (marker member 600) is present in front of the body of an occupant 20 seated in the driver's seat; therefore, it can be determined that the occupant 20 is wearing the seat belt 40. On the other hand, there is no seat belt 40 (no marker member 600) in front of the body of an occupant 20 seated in the passenger's seat; therefore, it can be determined that the occupant 20 in the passenger's seat is not wearing the seat belt 40.

However, even in the case where the seat belt 40 (marker member 600) is present in front of the body of the occupant 20, the occupant 20 seated in the driver's seat may wear the seat belt 40 in a condition as shown in FIG. 4B, in which the belt is likely to be twisted and the occupant 20 is not in a correct wearing condition. To deal with this condition, the determining unit 400 determines whether the seat belt 40 (marker member 600) is located so as to match a specified, correct wearing pattern. More specifically, where the seat belt is a three-point-type seat belt, the determining unit 400 determines whether the seat belt 40 (marker member 600) matches a pattern (see FIG. 4A) in which a shoulder belt hangs obliquely across the body, from the shoulder on one side of the occupant 20 to the waist on the other side, and a waist belt extends across (crosses) the waist. Where the seat belt is a two-point-type seat belt, the determining unit 400 determines whether the seat belt 40 (marker member 600) matches a pattern in which a waist belt extends across the waist of the occupant 20. In this manner, it can be determined with high accuracy whether the occupant 20 is wearing the seat belt 40. In this connection, it is also possible to determine whether the seat belt 40 is twisted, by providing marker members 600 having different patterns on one surface and the other surface of the seat belt 40.

Also, the rate of reflection or absorption of electromagnetic waves of the prescribed wavelength band by the marker member 600 is made different from the rate of reflection or absorption of electromagnetic waves of the prescribed wavelength band by the material of the seat belt 40. Thus, even when the reflection rate or absorption rate of the clothes worn by the occupant 20 is equal to that of the marker member 600 or the seat belt 40, the positional relationship between the occupant 20 and the seat belt 40 can be estimated by using one of the marker member 600 and the seat belt 40, thus making it possible to determine a condition in which the occupant 20 wears the seat belt 40 (see FIG. 4C, for example).

A difference is considered to appear in conditions of the seat belt 40 worn by the occupant 20, according to a difference in the physical size of the occupant 20. In the case of an occupant having obese habitus and a big belly, for example, the seat belt 40 is presumed to be placed on the body in a little deflected or distorted condition so as to avoid the belly. Also, in the case of a tall occupant, for example, the seat belt 40 is presumed to be placed on the body with the position of a seat belt anchor elevated.

Figure 5:
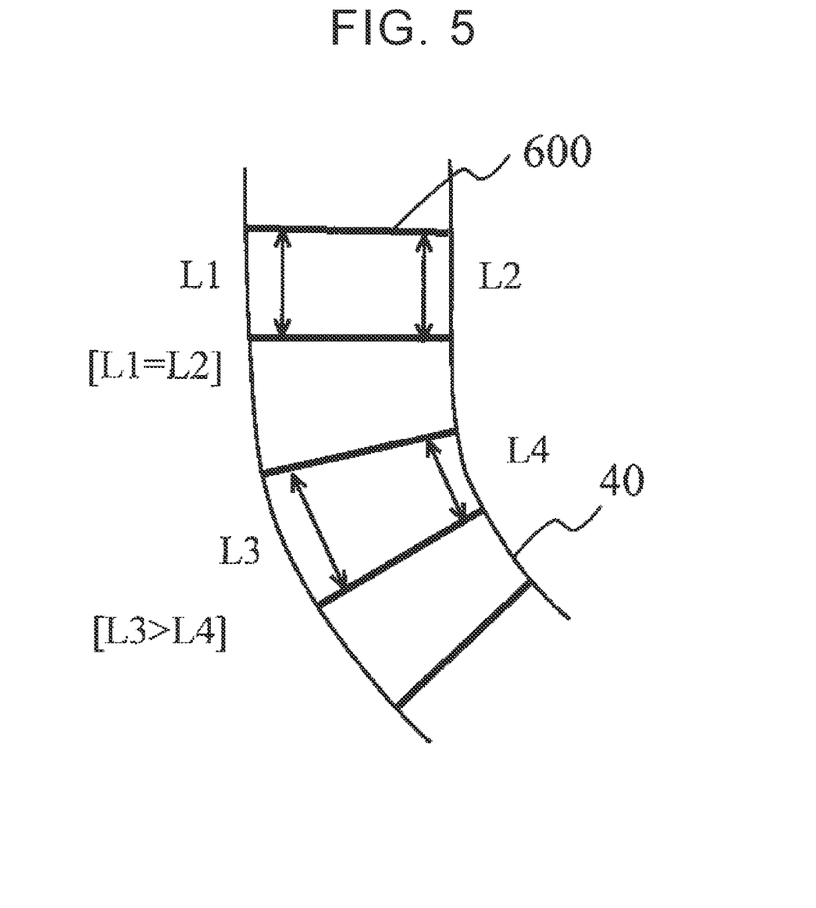
FIG. 5 is a view useful for describing a condition in which the seat belt is deflected.

By utilizing the above, it is possible to determine a condition (deflection, distortion) of the seat belt 40, by detecting change (change from L1=L2 to L3>L4) of the marker member 600 having a striped pattern in the two-dimensional image created by the image processing unit 200, as shown in FIG. 5 by way of example. It is thus possible to determine that the occupant 20 has obese habitus, for example, when the seat belt 40 is placed on the body in the deflected or distorted condition. Also, the height of the occupant can be determined, by detecting an interval between the feed position of the shoulder belt and the waste belt in the two-dimensional image created by the image processing unit 200. The physical size of the occupant 20 determined in the above manners may be reflected by various kinds of vehicle equipment and service, for example.

As described above, in the seat belt wearing condition determining system 10 according to the embodiment of the disclosure, the marker member 600 provided on the seat belt 40 is made of a material that reflects or absorbs electromagnetic waves of a prescribed wavelength band at a different rate from the material of the seat belt 40. Thus, the marker member 600 and the seat belt 40 are displayed such that they can be distinguished from each other, in the two-dimensional image captured in the predetermined range and indicating the intensity distribution of electromagnetic waves of the prescribed wavelength band. Therefore, even when the reflection rate or absorption rate of the clothes of the occupant 20 is close to that of the marker member 600 or the seat belt 40, the positional relationship between the occupant 20 and the seat belt 40 can be grasped based on either one of the marker member 600 and the seat belt 40. Accordingly, the condition of wearing of the seat belt 40 by the occupant 20 can be determined with high accuracy, irrespective of the clothes of the occupant 20.

In the seat belt wearing condition determining system 10 according to this embodiment, the marker member 600 is provided on the seat belt 40 so as to extend along the longitudinal direction of the seat belt 40, and the system 10 determines that the occupant 20 is wearing the seat belt 40 when the seat belt 40 is located at a position that matches the predetermined wearing pattern extending across the body of the occupant 20. Thus, since the seat belt wearing condition determining system 10 can determine the correct wearing pattern of the seat belt 40 extending across the body of the occupant 20, such as oblique hanging of the shoulder belt of the three-point-type seat belt, the system 10 can determine with high accuracy that the occupant 20 is wearing the seat belt 40.

Also, in the seat belt wearing condition determining system 10 according to this embodiment, the marker member 600 is provided on the seat belt 40 such that the opposite surfaces of the seat belt 40 can be distinguished from each other. Thus, the system 10 can determine whether the seat belt 40 is twisted.

The case where the occupant 20 wearing the seat belt 40 is covered with a blanket such that the blanket is placed over the seat belt 40 is assumed. In this case, the blanket may reflect the visible light, or infrared rays or ultraviolet rays around the visible light, and the marker member 600 provided on the seat belt 40 may not be correctly detected. Thus, the electromagnetic waves of the prescribed wavelength band are desirably set to radio waves with wavelengths (GHz band) included in a region excluding the visible light, infrared rays, and ultraviolet rays, for example, wavelengths in a range of 3 to 300 mm.

The marker member 600 may be provided on objects other than the seat belt 40, to thus find various applications. In the case of a child seat installed using the seat belt 40, for example, if the wearing condition is determined solely based on the marker member 600 provided on the seat belt 40 as described above, it may be determined that the wearing condition is normal even though the child seat is not on board the vehicle.

Figure 6:
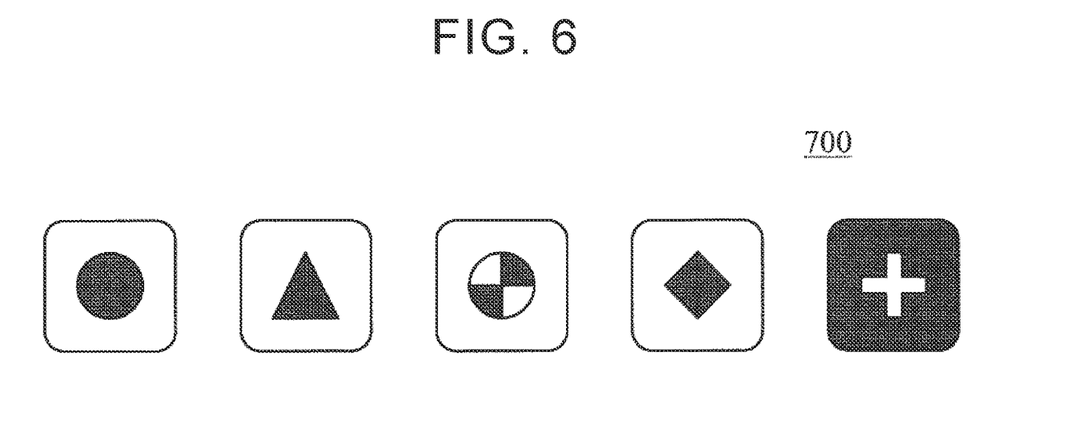
FIG. 6 is a view showing examples of marks of a marker seal.

Thus, a certain marker member may also be provided on the child seat, for example, and the seat belt 40 and the child seat may be determined as being correctly mounted in place when the respective marker members can be detected on both the seat belt 40 and the child seat. The marker member for the child seat may be easily provided by attaching a marker seal 700 on which a mark, such as a given figure, alphabet, or a string of characters, as shown in FIG. 6 by way of example, is printed, to the child seat. The marker seal 700 can also reflect or absorb electromagnetic waves of a prescribed wavelength band, in a similar manner to the marker member 600. In the case where the user owns two or more child seats corresponding to the respective ages of children, for example, two or more different marker seals 700 may be attached to the respective child seats, and may be used for determining whether a child seat appropriate for a child concerned is mounted on the vehicle.

An object to which each marker seal 700 is attached may be determined in advance, or each marker seal 700 may be attached to various objects depending on the taste of the occupant. In this case, the object to which the marker seal 700 is attached may be associated with the mark on the marker seal 700. A process for associating the mark with the object may be performed according to a procedure shown in FIG. 7.

Figure 7:
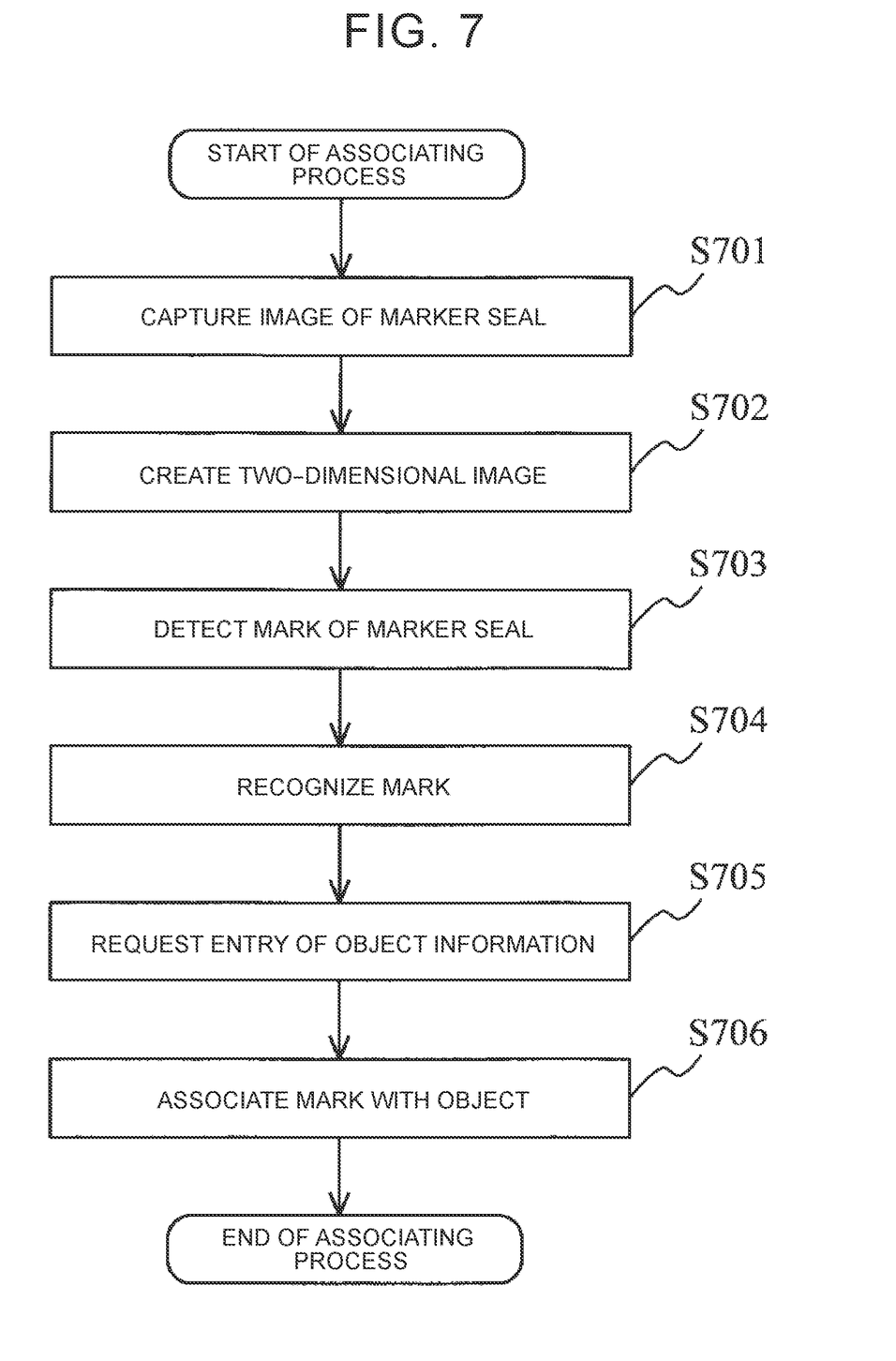
FIG. 7 is a flowchart illustrating a procedure for associating a mark with an object.

Step S701: the image capture unit 100 captures an image of the marker seal 700 that is placed in the selected range and has not been associated with an object to which the marker seal 700 is attached.

Step S702: the image processing unit 200 creates a two-dimensional image in the selected range, based on reflected waves of electromagnetic waves of the prescribed wavelength band captured by the image capture unit 100.

Step S703: the shape estimating unit 300 detects a mark of the marker seal 700 from the two-dimensional image created by the image processing unit 200.

Step S704: the determining unit 400 recognizes the mark detected by the shape estimating unit 300.

Step S705: the informing unit 500 requests the occupant 20 to enter information (such as a name) of the object with which the mark recognized by the determining unit 400 is to be associated.

Step S706: the determining unit 400 learns (registers) the recognized mark and the object while associating them with each other, according to the information of the object entered by the occupant 20.

Through the associating process as described above, the marker seal 700 can be used with a high degree of freedom; for example, the marker seal 700 may be attached to a bag of an occupant. Also, when a mark that has already been associated with an object through the associating process as described above is detected, the probability of the detection may be calculated. Then, when two or more marks of which the probability does not reach a given threshold value are found, the occupant may be inquired of about the existence of objects corresponding to the possible number of items and names.

This disclosure may be regarded not only as the seat belt wearing condition determining system, but may be regarded as a method implemented by a computer of the seat belt wearing condition determining system, program executed by the computer, recording medium of the program, or a vehicle on which the seat belt wearing condition determining system is installed.

This disclosure may be utilized in a vehicle, or the like, in which a seat belt needs to be used.

What is claimed is:

1. A system that determines a condition of wearing of a seat belt for an occupant, comprising:
    a marker provided on at least a part of the seat belt, the marker being configured to reflect or absorb electromagnetic waves of a prescribed wavelength band at a different rate from a material of the seat belt;
    an image capture unit that emits electromagnetic waves of the prescribed wavelength band toward a predetermined range including the occupant seated in a seat; and
    a processor configured to:
        create an image indicating intensity distribution of electromagnetic waves of the prescribed wavelength band, based on reflected waves reflected in the predetermined range,
        estimate a shape of the occupant based on the image,
        detect the marker from the image,
        estimate a shape of the seat belt based on the marker detected,
        determine a physical size of the occupant based on the shape of the seat belt, and determine the condition of wearing of the seat belt by the occupant, based on a positional relationship between the occupant and the seat belt after the shape of the occupant and the shape of the seat belt are estimated.

2. The system according to claim 1, wherein:
the marker extends along a longitudinal direction of the seat belt; and
the processor determines that the occupant is wearing the seat belt when the seat belt is located at a position that matches a predetermined wearing pattern extending across a body of the occupant.

3. The system according to claim 1, wherein the marker is provided on one surface of the seat belt.

4. The system according to claim 1, wherein the processor is configured to give a notice that urges the occupant to wear the seat belt when the processor determines that the occupant is not wearing the seat belt.

5. The system according to claim 1, wherein the electromagnetic waves of the prescribed wavelength band comprise radio waves having a wavelength included in a range of 3 to 300 mm.

6. A vehicle comprising:
a seat belt;
a marker provided on at least a part of the seat belt, the marker being configured to reflect or absorb electromagnetic waves of a prescribed wavelength band at a different rate from a material of the seat belt;
an image capture unit that emits electromagnetic waves of the prescribed wavelength band, toward a predetermined range including an occupant seated in a seat; and
a processor configured to:
create an image indicating intensity distribution of electromagnetic waves of the prescribed wavelength band, based on reflected waves reflected in the predetermined range;
estimate a shape of the occupant based on the image, detect the marker from the image, and estimate a shape of the seat belt based on the marker detected;
determine a condition of wearing of the seat belt by the occupant, based on a positional relationship between the occupant and the seat belt after the shape of the occupant and the shape of the seat belt are estimated; and
determine a physical size of the occupant based on the shape of the seat belt.

7. A method of determining a condition of wearing of a seat belt for an occupant, at least a part of the seat belt being provided with a marker configured to reflect or absorb electromagnetic waves of a prescribed wavelength band at a different rate from a material of the seat belt, the method comprising:
emitting electromagnetic waves of the prescribed wavelength band, toward a predetermined range including the occupant seated in a seat;
creating an image indicating intensity distribution of electromagnetic waves of the prescribed wavelength band, based on reflected waves reflected in the predetermined range;
estimating a shape of the occupant based on the image, detecting the marker from the image, and estimating a shape of the seat belt based on the marker detected;
determining the condition of wearing of the seat belt by the occupant, based on a positional relationship between the occupant and the seat belt after the shape of the occupant and the shape of the seat belt are estimated; and
determining a physical size of the occupant based on the shape of the seat belt.

* * * * *